United States Patent [19]

Merenda

[11] 4,266,412
[45] May 12, 1981

[54] FILTERING DEVICE FOR DRY CLEANING

[76] Inventor: Rosario Merenda, 966 Port Washington Blvd., Port Washington, N.Y. 11050

[21] Appl. No.: 53,245

[22] Filed: Jun. 29, 1979

[51] Int. Cl.³ .............................................. D06F 43/08
[52] U.S. Cl. ................................... 68/18 F; 210/167; 210/437; 210/451; 210/457; 210/490
[58] Field of Search .............. 210/435, 437, 450, 455, 210/457, 460–463, 484, 488, 490, 497 R, 498, 167, 451; 68/18 F

[56] References Cited

U.S. PATENT DOCUMENTS

| | | | |
|---|---|---|---|
| 2,728,458 | 12/1955 | Schultz | 210/484 X |
| 2,904,186 | 9/1959 | Moore | 210/437 |
| 2,926,594 | 3/1960 | Werner et al. | 210/484 X |
| 2,946,449 | 7/1960 | Shaw | 210/437 X |
| 2,946,450 | 7/1960 | Shaw | 210/437 X |
| 3,023,906 | 3/1962 | Moore | 210/484 |
| 3,670,898 | 6/1972 | Fournier | 210/484 X |
| 4,028,248 | 6/1977 | Murauskas et al. | 210/463 X |

*Primary Examiner*—S. Leon Bashore
*Assistant Examiner*—Ferris H. Lander
*Attorney, Agent, or Firm*—Jordan and Hamburg

[57] ABSTRACT

A filtering device for a dry cleaning machine comprising a casing having a door at one end, an inlet conduit means situated in said casing and having a plenty of perforations at a periphery thereof, outlet conduit means at the front or rear part of said casing, a first filter assembly in said casing and spacer means situated between said first filter assembly and said casing. The first filter assembly includes an elongated base member to substantially cover the inlet conduit means and having a plenty of perforations at a periphery thereof, a plurality of flanges detachably connected around the base member and first filter means carried by the flanges to substantially cover the base member. The spacer means includes a porous wall and a plenty of ribs provided at an outer periphery of the wall.

3 Claims, 6 Drawing Figures

FILTERING DEVICE FOR DRY CLEANING

BACKGROUND OF THE INVENTION

The invention relates to a filtering device for a dry cleaning machine, more particularly a filtering device for removing solid particles contained in a dry cleaning solvent used in cleaning clothes.

Dry cleaning is widely known and used in cleaning clothes. The solvent used in dry cleaning is expensive, so that it is preferable to use the solvent many times. Once the solvent is used, then mud, oil, lint and the like attached to clothes are contained in the solvent. Accordingly, the impurities contained in the solvent must be removed therefrom to enable reuse of the solvent.

Generally, the dry cleaning machine includes a filter means to purify the solvent, which operates to mechanically remove the insoluble impurities and/or to chemically adsorb the dissolved impurities. In circulating the solvent in the dry cleaning machine to purify the solvent, the filter is apt to be clogged by solid impurities, so that the filter must be replaced periodically. In order to solve the clogging problem, many filter systems have been proposed.

In U.S. Pat. No. 3,199,679, a filter system for dry cleaning solvents is disclosed, which comprises filter cartridges A and B through which solvent flows. The filter A includes cellulose material in a cannister and the filter B includes activated carbon and bristle blankets. Dissolved and solid impurities are removed by passing the solvent through the filters.

U.S. Pat. No. 3,231,324 discloses a dry cleaning method in which cleaning solvent is circulated through a filter and a color removal device which serves to take out color or odor bearing materials dissolved into the solvent during the cleaning operation. Color removal agent is contained within a fabric container and is positioned in a tank. Periodically, the solvent is caused to flow through the color removal device.

An apparatus for purifying liquids is disclosed in U.S. Pat. No. 3,295,689, wherein cleaning solvent containing impurities is caused to flow through a delinter and a filter so that the impurities are removed therefrom. The delinter comprises a tank, a perforated cylindrical basket supported in the tank and a bag within the basket, and the filter includes an outer filter member and a rotatable inner filter member. The delinter serves to at first remove solid impurities suspended in the solvent, but it does not properly operate due to the fact that there are not sufficient flow paths in the bag. Namely, the bag is soon clogged and it is necessary to replace the bag quite often.

Therefore, an object of the invention is to provide a filtering device for a dry cleaning machine which can substantially remove solid impurities contained in a solvent used in a dry cleaning process prior to the removal of dissolved impurities from the solvent.

Another object of the invention is to provide a filtering device for a dry cleaning machine which can be easily handled and maintained.

A further object of the invention is to provide a filtering device for a dry cleaning machine which is inexpensive and is easily manufactured.

Other objects and advantages of the invention will be apparent from the following description of the invention.

SUMMARY OF THE INVENTION

In accordance with the invention, there is provided a filtering device for a dry cleaning machine. The filtering device comprises a casing having a door at one end, an inlet conduit means situated in said casing and having a plurality of perforations at the periphery thereof, outlet conduit means at the front or rear part of the casing, a first filter assembly including an elongated base member to substantially cover the inlet conduit means and having a plurality of perforations at the periphery thereof, a plurality of flanges detachably connected around the base member and first filter means carried by the flanges to substantially cover the base member, and spacer means situated between the first filter assembly and the casing, the spacer means including a porous wall and a plurality of ribs provided at an outer periphery of the wall. The filtering device may include second filter assemblies situated within the first filter assembly. Each second filter assembly comprises a frame having outer vertical flanges abutting the flanges of the first filter assembly and a perforated wall and second filter means supported by the outer flanges. The second filter means, preferably, includes two filter layers, the outer layer of which is finer than the inner layer, so that large impurities are removed by the inner filter layer. Thus, solid impurities are gradually removed by the filters of different mesh size, and, therefore, all the solid impurities are removed without clogging of the filter.

In a rear end wall of the casing, an annular shoulder projecting inwardly therefrom is provided to snugly fit with the base member of the first filter assembly. The inlet conduit means includes a threaded front projection which extends through the front flange of the first filter assembly. Therefore, the first filter assembly is positioned such that the inlet conduit means is situated therein and a nut is fastened to the front projection, so that the first filter assembly is fixed within the casing.

DETAILED DESCRIPTION OF PREFERRED EMBODIMENTS

Figure 1:
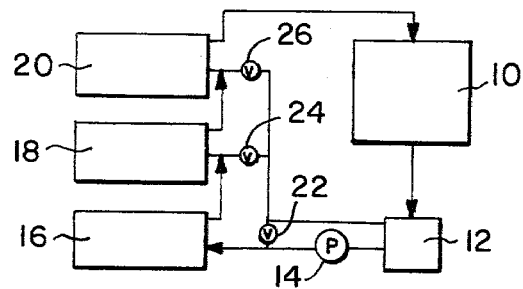
FIG. 1 is a diagrammatic view of a dry cleaning system using the filtering device of the present invention.

Referring to the drawings, FIG. 1 shows a dry cleaning system using filtering devices of the invention, in which clothes to be cleaned are received in a drum 10 being rotated by a motor (not shown), in which the clothes are cleaned by a conventional dry cleaning solvent.

The solvent used in cleaning clothes in the drum 10 flows to a tank 12 and is stored therein, which, therefore, contains various impurities, such as lint, soil, oils and other odor- and color-imparting substances. When the solvent is used to clean clothes, the solvent is sent to the drum 10 by a pump 14 through filter units 16, 18, 20. The first and second stage filter units 16, 18 are constructed in accordance with the present invention and operate to remove solid or insoluble impurities from the solvent. The third stage filter unit 20, which is a conventional type including activated carbon, serves to remove soluble impurities from the solvent by adsorbing the same. Since the filter units 16, 18 substantially remove the solid impurities, the filter unit 20 does not clog, so that effective use is made of the adsorbent in the unit 20 so long as it has adsorption ability. Incidentally, valves 22, 24, 26 are provided to discharge the solvent in the filter units back to the tank 12.

Figure 2:
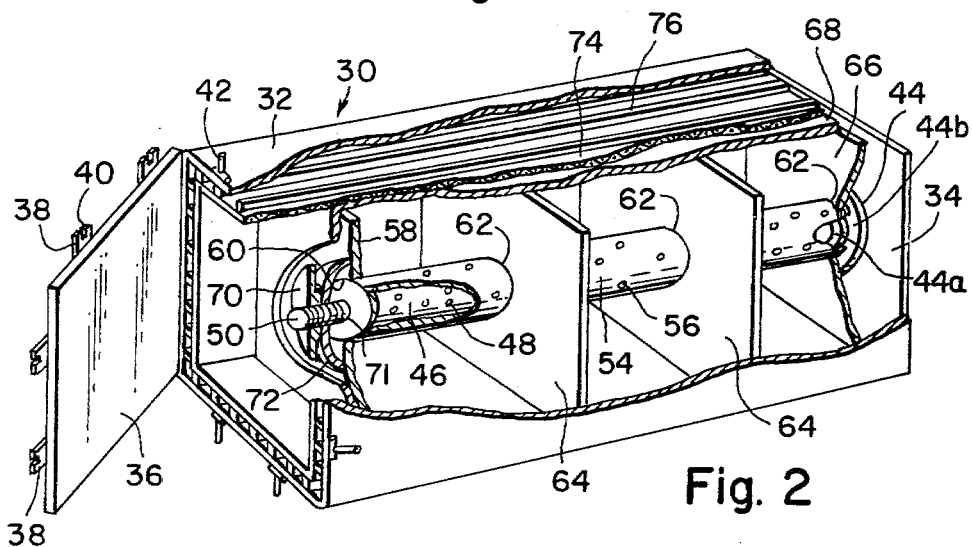
FIG. 2 is a partial cross-sectional perspective view of the filtering device of the present invention.
Figure 3:
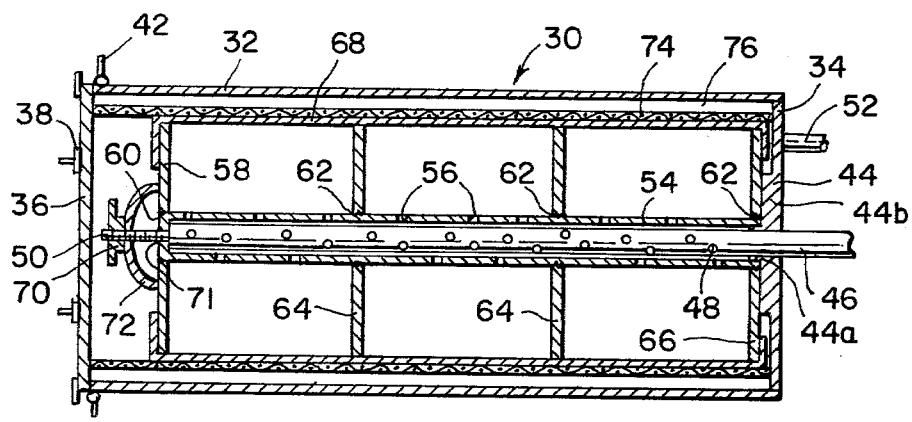
FIG. 3 is a cross-sectional view of the filtering device of the present invention.

The filter device 30 in accordance with the present invention is shown in FIGS. 2 and 3. The device 30 includes a rectangular casing 32 having a rear end wall 34 and a front door 36 which is hingedly secured to the body of the casing 32. A plurality of ears 38 each having a notch 40 is provided around the door 36 and a plurality of locking arms 42 is secured to the body of the casing 32, so that the door 36 can be sealingly secured. The rear end wall 34 includes a double annular shoulder 44 inwardly projecting therefrom for the purpose stated hereinafter.

An inlet conduit 46 is situated in the casing 32 and extends along the longitudinal direction thereof through the rear end wall 34 and includes a plurality of perforations 48 at a peripheral wall thereof and a threaded projection 50 at a front end. An outlet conduit 53 is provided at the rear end wall 34 of the casing 32.

Around the inlet conduit 46 there is situated a base member 54 having a plurality of perforations 56 at the peripheral wall thereof, to which a rectangular front flange 58 having a central opening 60 is connected by means of welding and the like. Male threads 62 are also provided at predetermined intermediate portions and a rear portion of the base member 54, and intermediate flanges 64 and a rear flange 66 having female threads corresponding to the male threads 62 respectively are threadably connected to the base member 54. Tubular filter means 68 made of fabric is provided around the flanges, both ends of which are tightended against each flange by draw strings (not shown), so that the filter means 68 can be replaced when it is clogged. The base member 54, the flanges 58, 64, 66, and the filter means 68 constitute a first filter assembly which is detachably positioned within the casing 32. Namely, when the first filter assembly is inserted over the inlet conduit 46, a rear end of the base member 54 is sealingly received by a first annular shoulder 44a and the projection 50 extends through the opening 60. Therefore, a nut 70 is fastened through a sealing pan 72 to the projection 50, thereby the first filter assembly being situated within the casing.

A metal screen 74 and a plurality of ribs 76 are situated between the filter means 68 and the casing 32 so as to support the filter 68 against fluid pressure when the solvent is filtered.

The solvent flows into the casing 32 through the inlet conduit 46 and reaches spaces between the ribs 76 after passing through the base member 54, the filter 68 and the metal screen 74. The solvent then flows into a space between the rear end wall and the rear flange 66 which is provided by a second annular shoulder 44b and flows out through the outlet conduit 52.

Figure 4:
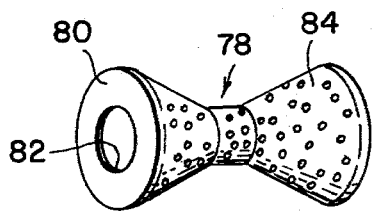
FIG. 4 is a perspective view of a frame of a second filter assembly.
Figure 5:
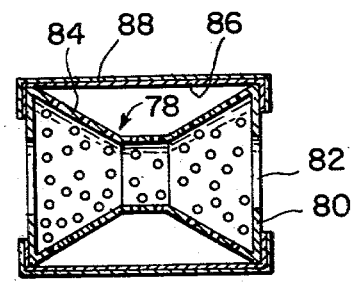
FIG. 5 is a cross-sectional view of the second filter assembly.
Figure 6:
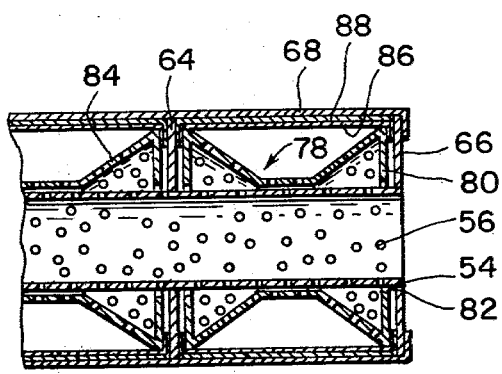
FIG. 6 is a cross-sectional view of the filter assemblies in which the second filter assembly is situated within the first filter assembly.

In FIG. 5, there is shown a second filter assembly which is situated within a first filter assembly. A frame 78 of the second filter assembly (FIG. 4) comprises circular outer flanges 80 each having an opening 82 and a perforated wall 84 having a contracted section intermediate the ends thereof. Two filter layers 86, 88 cover over the frame 78, both ends of which are tightly fastened by draw strings (not shown) in order to permit easy replacement of the same. The outer filter layer 88 is finer than the inner filter layer 86, whereby large sized impurities are at first removed by the inner layer 86. When the second filter assemblies are situated within the first filter assembly, the flanges 64, 66 are detached from the base member 54, and the second filter assembly and the flanges are arranged over the base member 54 one after another. Finally, the filter means 68 is covered around the flanges.

In the case of the dry cleaning system as shown in FIG. 1, preferably, the filter device including only the first filter assembly may be used as the filter unit 16 and the filter device with the second filter assembly as well as the first filter assembly is used as the filter unit 18. However, either filter device may be used in the dry cleaning system.

The invention has been described with reference to the preferred embodiments, but it is to be understood that explanation is to be illustrative and the invention is only limited by the appended claims.

What is claimed is:

1. A dry cleaning system for cleaning clothes by cleaning solvent circulating therethrough, comprising a drum in which the clothes to be cleaned are placed, a tank for receiving the cleaning solvent after use in the drum for washing, a pump for circulating the cleaning solvent in the tank to the drum, a first filtering device situated between the drum and the pump for removing impurities dissolved in the cleaning solvent before re-using the solvent, and at least one second filtering device connected to the first filtering device for removing solid impurities before the soluble impurities are removed at the first filtering device, said second filtering device comprising a casing including a front door and a rear end wall having an annular shoulder projecting inwardly therefrom, an inlet conduit means situated in said casing and passing through the rear end wall, said inlet conduit means having a plurality of perforations at the periphery thereof and a threaded front projection, outlet conduit means at the rear end wall of the casing, a first filter assembly including an elongated base member to substantially cover said inlet conduit means and to snugly fit with the annular shoulder of the rear end wall, said base member having a plurality of perforations at the periphery thereof, a plurality of flanges detachably connected around said base member and first filter means carried by said flanges to substantially cover said base member, said threaded front projection of the inlet conduit means extending through the front flange of the first filter assembly and being fastened by a nut to thereby position the first filter assembly around the inlet conduit means, spacer means situated between said first filter means and said casing, said spacer means including a porous wall and a plurality of ribs provided at the outer periphery of the porous wall, and a plurality of second filter assemblies situated between the flanges of the first filter assembly, each second filter assembly including a frame having outer vertical flanges abutting said flanges of said first filter assembly and a perforated wall having a contracted section intermediate the ends thereof, and second filter means replaceably supported by said outer flanges of the second filter assembly, whereby the cleaning solvent flowing from the tank into the second filtering device through the inlet conduit means passes through the second and first filter means, so that the solid impurities are removed, and flows through spaces between the spacer means, and the solvent is transferred to the first filtering device by means of the outlet conduit means.

2. A dry cleaning system according to claim 1 wherein two of said second filtering devices are provided in series for completely filtering out solid impurities from the used cleaning solvent before removing the soluble impurities in the first filtering device.

3. A dry cleaning system according to claim 1 wherein said second filter means includes two filter layers, the outer layer of which is finer than the inner layer.

* * * * *